US012716436B1

(12) United States Patent
Shepherd, III

(10) Patent No.: US 12,716,436 B1
(45) Date of Patent: Aug. 25, 2026

(54) VERTICALLY ORIENTED CLIP AND/OR FASTENER

(71) Applicant: Mason R. Shepherd, III, New Brunswick, NJ (US)

(72) Inventor: Mason R. Shepherd, III, New Brunswick, NJ (US)

( * ) Notice: Subject to any disclaimer, the term of this patent is extended or adjusted under 35 U.S.C. 154(b) by 0 days.

(21) Appl. No.: 17/937,211

(22) Filed: Sep. 30, 2022

(51) Int. Cl.
*F16B 1/00* (2006.01)
*B42F 1/00* (2006.01)

(52) U.S. Cl.
CPC .................................... *F16B 1/00* (2013.01); *B42F 1/00* (2013.01); *F16B 2200/83* (2023.08)

(58) Field of Classification Search
CPC ........... F16B 1/00; F16B 2200/83; B42F 1/00
See application file for complete search history.

(56) References Cited

U.S. PATENT DOCUMENTS 4,255,837 A * 3/1981 Holtz ...................... B42F 11/04 40/658
8,826,497 B2 * 9/2014 Amron ..................... A45C 1/06 24/67.3
9,510,655 B2 * 12/2016 Stratton ............. A45C 13/1069
10,893,713 B2 * 1/2021 Popoca Perez ......... A41F 9/002
11,024,449 B2 * 6/2021 Bharadwaj .......... H01F 1/15375
11,133,122 B2 * 9/2021 Vazquez ................ A44B 99/00
2006/0282993 A1 * 12/2006 Dietz ..................... B43K 25/02 24/303
2011/0056437 A1 * 3/2011 Sprung ................ A01K 63/006 119/51.04
2015/0223573 A1 * 8/2015 Vecchione ................ F16B 1/00 24/482
2015/0366301 A1 * 12/2015 Bonno ...................... F16B 2/22 24/303
2016/0003269 A1 * 1/2016 Russell-Clarke .. A44B 17/0005 24/303
2017/0043948 A1 * 2/2017 Badger ..................... B65F 1/06
2017/0282781 A1 * 10/2017 Christiansen, Jr. ..... B60P 7/083
2018/0206814 A1 * 7/2018 De La Fuente .......... A61B 7/02
2018/0281660 A1 * 10/2018 Dahlin ...................... F16B 2/08
2018/0368602 A1 * 12/2018 Albanese .............. F16B 45/023
2020/0367592 A1 * 11/2020 James ...................... A42B 1/24
2021/0020344 A1 * 1/2021 Vazquez ................ A44B 99/00
2023/0082933 A1 * 3/2023 Chilukuri ................ A47J 45/02 211/86.01

* cited by examiner

*Primary Examiner* — David M Upchurch
(74) *Attorney, Agent, or Firm* — Law Offices Of Mitchell P. Novick

(57) ABSTRACT

Embodiments of this invention ("Clip") include devices and methods for suspending multiple papers of any weight vertically with no damage to the papers or vertical surface, and less effort than the prior art. One embodiment is a novel paper fastener especially for vertical surfaces. This embodiment allows one or multiple sheets of paper to be suspended without damaging the paper or wall with holes and adhesive. The Clip employs the attraction of magnets such as neodymium magnets and requires only a short upward motion to initiate the suspension. Once suspended, the papers are held tightly, yet can be easily removed without damage. The Clip automatically resets to its receptive state upon removal of the papers. Another embodiment is semi-permanent and can be repositioned on any non-metallic surface. Still another embodiment can be repositioned on a metallic surface without compromising the holding or suspending abilities of the Clip.

8 Claims, 5 Drawing Sheets

VERTICALLY ORIENTED CLIP AND/OR FASTENER

FIELD OF THE INVENTION

Embodiments of the present invention include clips and fasteners for holding one or more relatively thin items, such as sheets or pieces of paper. More specifically, embodiments of this invention include devices for temporarily or semi-permanently holding one or more items in a vertical orientation.

BACKGROUND OF THE INVENTION

In the prior art, there are various devices and techniques available to temporarily or semi-permanently hold relatively thin items, such as sheets of paper, in a vertical orientation, such as attachment to a wall.

Thumbtacks, or other tacks, may be the most common way to suspend calendars/papers. Thumbtacks are reusable. However, the main drawback to this approach is that hanging paper from a wall with thumbtacks causes damage to the wall and the paper by leaving behind holes in the wall. Further, when a hole is reused many times, it becomes too large to hold a thumbtack securely and the thumbtack falls out, thereby failing to keep the paper(s) attached to the wall.

Another class of prior art includes adhesive tapes as well as other strip adhesives. These tapes are applied to the back of the paper to be suspended, as well as to the wall. This approach is limited to holding one sheet of paper at a time, and therefore is not practical for repositioning papers. Also, unfortunately, the tape cannot be reused and often tears the paper or the wall (paint, finish, or sheetrock) upon removal.

The prior art also includes bulletin boards, which allow for papers to be suspended in a repositionable way. However, one must incur the time and expense of purchasing the bulletin boards. Further, bulletin boards require the purchase of specialized mounting hardware and skill in their mounting.

The prior art also includes magnets. Magnets are a good option for repositionability; however, they only work on metallic objects, they are unstable having the propensity to slide down the surface due to a loss of friction/magnetic field strength, and otherwise require the mounting of a metallic bulletin board.

Further, the prior art discloses magnets attached to flexible strips which require significant, and often complicated manipulations in order to result in the strips surrounding and securing objects in between the magnets. One prior art example is disclosed in U.S. Pat. No. 4,258,493 to Kettlestrings, et al.

Thus, the prior art lacks an innocuous method which allows the affixation of multiple papers or other relatively thin items to a wall/vertical surface without damaging the paper and/or surface.

BRIEF SUMMARY OF THE INVENTION

An object of this invention is a device to affix temporarily one or more relatively thin items to a vertical surface without damaging the item(s) and/or surface.

Another object of this invention is a method to affix temporarily one or more relatively thin items to a vertical surface without damaging the item(s) and/or surface.

Still another object of this invention is a device to affix temporarily one or more relatively thin items to a vertical surface, which is operated using only one hand.

Yet another object of this invention is a method to affix temporarily one or more relatively thin items to a vertical surface, which is implemented using only one hand.

And another object of this invention is a device to affix temporarily one or more relatively thin items to a vertical surface, which device is stored in a disengaged/receptive ("open") position and ready for use.

Still another object of this invention is a device to affix temporarily one or more relatively thin items to a non-magnetic vertical surface.

Yet another object of this invention is a device to affix temporarily one or more relatively thin items to a magnetic vertical surface.

Embodiments of the present invention include a device and method for suspending multiple thin items of any weight vertically with no damage to the papers or vertical surface, and far less effort than any current suspension devices in the prior art. (Within this application, the invention will be sometimes referred to as the "Clip", the thin items will be sometimes referred to generically as "paper", and the vertical surface will be sometimes referred to generically to as "wall"; all of these definitions are without limiting the scope of this invention or its use.)

Using this Clip is tantamount to placing a sticker on the wall.

This Clip is a simpler, more aesthetic, and more elegant solution to all of the aforementioned prior art limitations.

An embodiment of the Clip is a novel paper fastener especially for vertical surfaces. This embodiment allows one or multiple sheets of paper to be effortlessly suspended without damaging the paper or wall with holes and adhesive. The Clip employs the strong attraction of magnets such as neodymium magnets and requires only a short upward motion pressing the papers against the Clip to initiate the suspension effect. Once suspended, the papers are held tightly, yet can be easily removed without damage.

An embodiment of the Clip is semi-permanent and can be repositioned on any non-metallic surface (e.g. wood, plastic, glass and more) using existing adhesive products; by way of illustration, without limitation, "Command" adhesive strips made by 3M Corporation may be employed.

Another embodiment of the Clip can be repositioned on a metallic surface without compromising the holding or suspending abilities of the Clip.

DETAILED DESCRIPTION OF THE INVENTION

Figure 1:
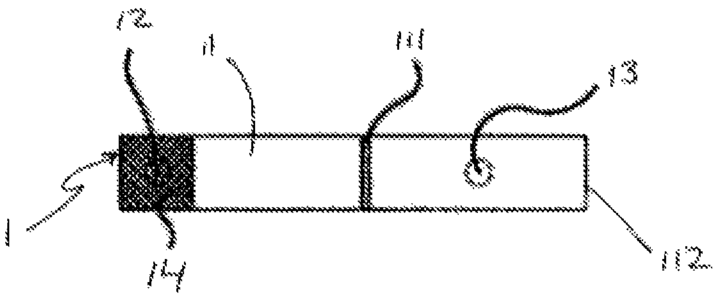
FIG. 1 is a top view of an embodiment of the Clip.
Figure 2:
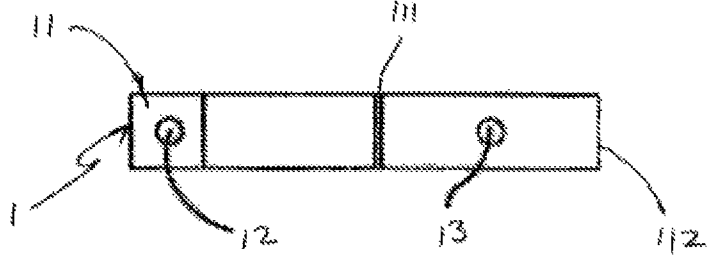
FIG. 2 is a bottom view of the Clip shown in FIG. 1.

An embodiment of the Clip 1 comprises a vertical paper fastener that uses vertical space to suspend papers, thin items, or small objects 2. The Clip 1 utilizes the magnetic attraction of magnets 12, 13 to grasp paper(s) 2 and hold them securely. What is especially convenient is the Clip's inherent ability to keep the magnets 12, 13 separated but proximate each other until they are used to hold papers 2.

This embodiment of the Clip 1 works with the use of multiple magnets 12, 13, a flexible connection strip ("ribbon") 11 with a magnet 12, 13 near each end of the strip, and a small piece of adhesive 14.

The magnets are 12, 13 are positioned so that when the ribbon 11 is flexed, opposite poles of the magnets 12, 13 will be linearly facing each other. Thus, the "north" pole 121 of one magnet will line up with and face the "south" pole 131 of the other magnet. Thereby, there will be attractive forces between the magnets 12, 13, rather than repulsive forces.

Preferably, the magnets 12, 13 have a large attractive force relative to their size and weight. In this embodiment, the preferred magnets 12, 13 are neodymium magnets.

In this embodiment, the ribbon 11 is preferably about three inches long. It is preferably made from nylon/polyester blend ribbon, although other flexible materials such as silicon, rubber, or plastic may be used. Choices of appropriate flexible materials are well known in the prior art.

Preferably, the ribbon 11 has a crease or thinned portion 111 perpendicular to and generally near the center of its long dimension. This crease 111 facilitates flexing or bending of the ribbon 11 during use of the Clip 1.

In this embodiment, a suitable material for the adhesive piece 14 is the "Command" removable adhesive strips made by 3M Corporation. Alternatively, any equivalent adhesive piece 14 well known in the prior art may be used.

Figure 3:
FIG. 3 is a side view of the Clip shown in FIG. 1, in disengaged/receptive state.
Figure 3:
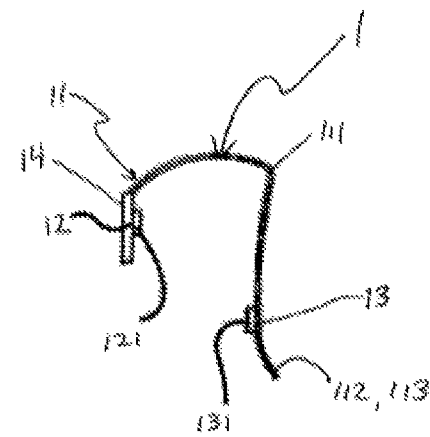

In use, the Clip 1 is semi-permanently attached to any non-metallic surface 3 (e.g. wood, plastic, glass, and more) using the adhesive 14. As desired or necessary, the Clip 1 may be removed from this surface 3 and repositioned on a similar surface 3. Next, the Clip 1 is set in its disengaged/receptive state (not suspending anything) (see FIG. 3)—the ribbon 11 stretched out and, thereby, the magnets 12, 13 positioned so as not touching nor being attracted to each other.

Figure 4:
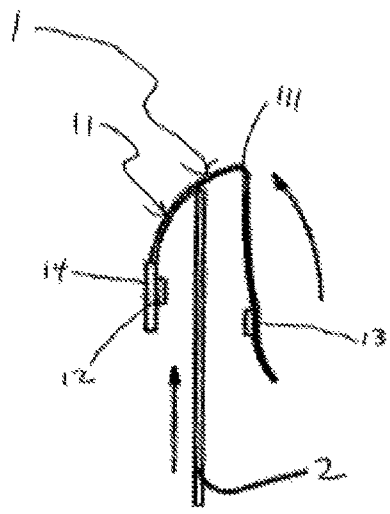
FIG. 4 is the side view of the Clip shown in FIG. 3, in use with a sheet being inserted.
Figure 5:
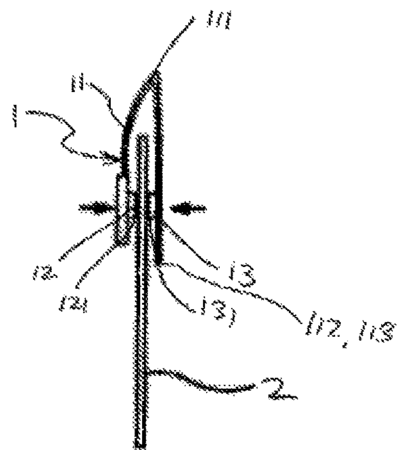
FIG. 5 is the side view of the Clip shown in FIG. 3, in engaged state, in use with a sheet secured by the Clip.
Figure 6:
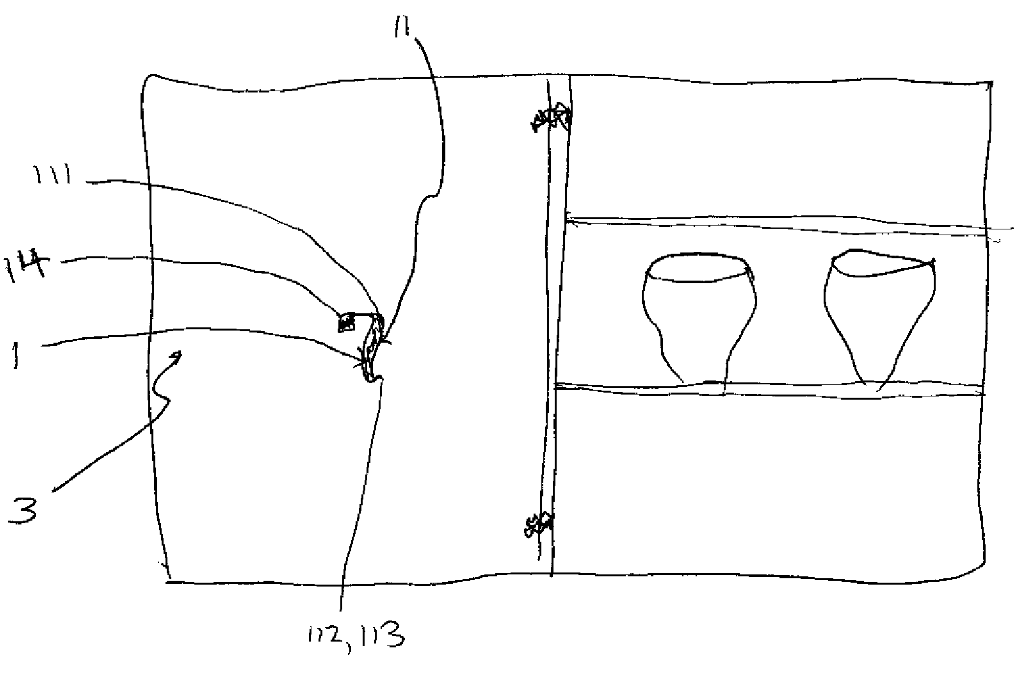
FIG. 6 is an embodiment of the Clip attached to a non-magnetic surface, in disengaged/receptive state.
Figure 7:
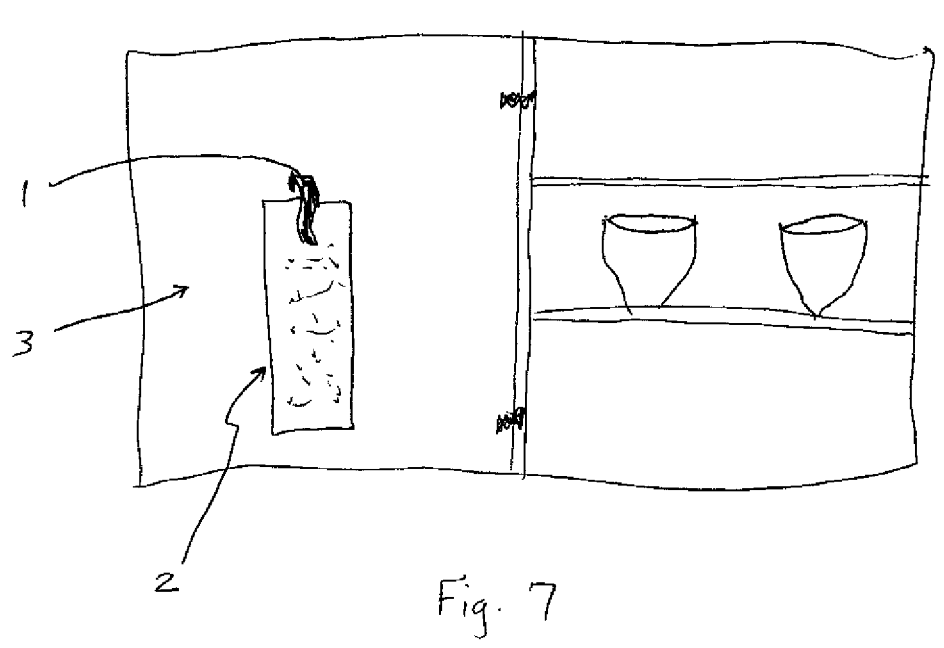
FIG. 7 is another embodiment of the Clip attached to a non-magnetic surface, in engaged state, in use with a sheet secured by the Clip.
Figure 8:
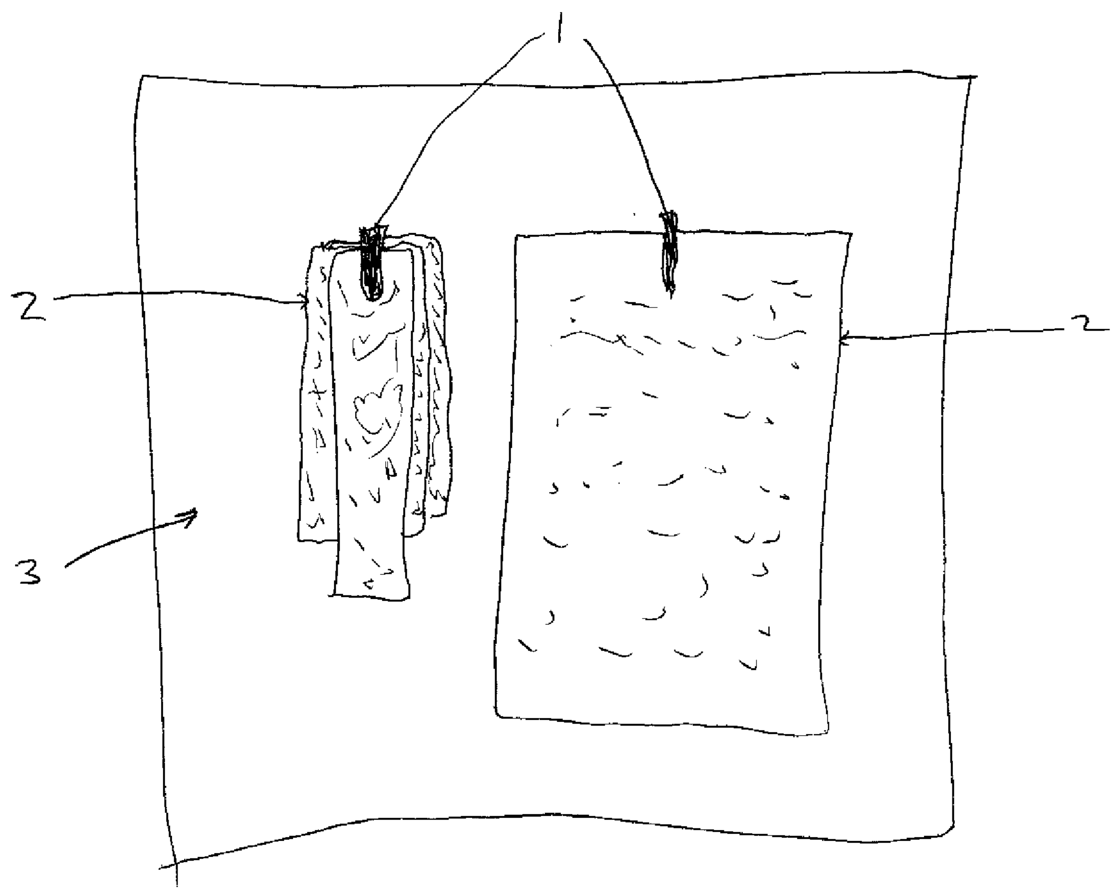
FIG. 8 are other embodiments of the Clip attached to a non-magnetic surface, in engaged state, in use with multiple sheets secured by the Clip.
Figure 9:
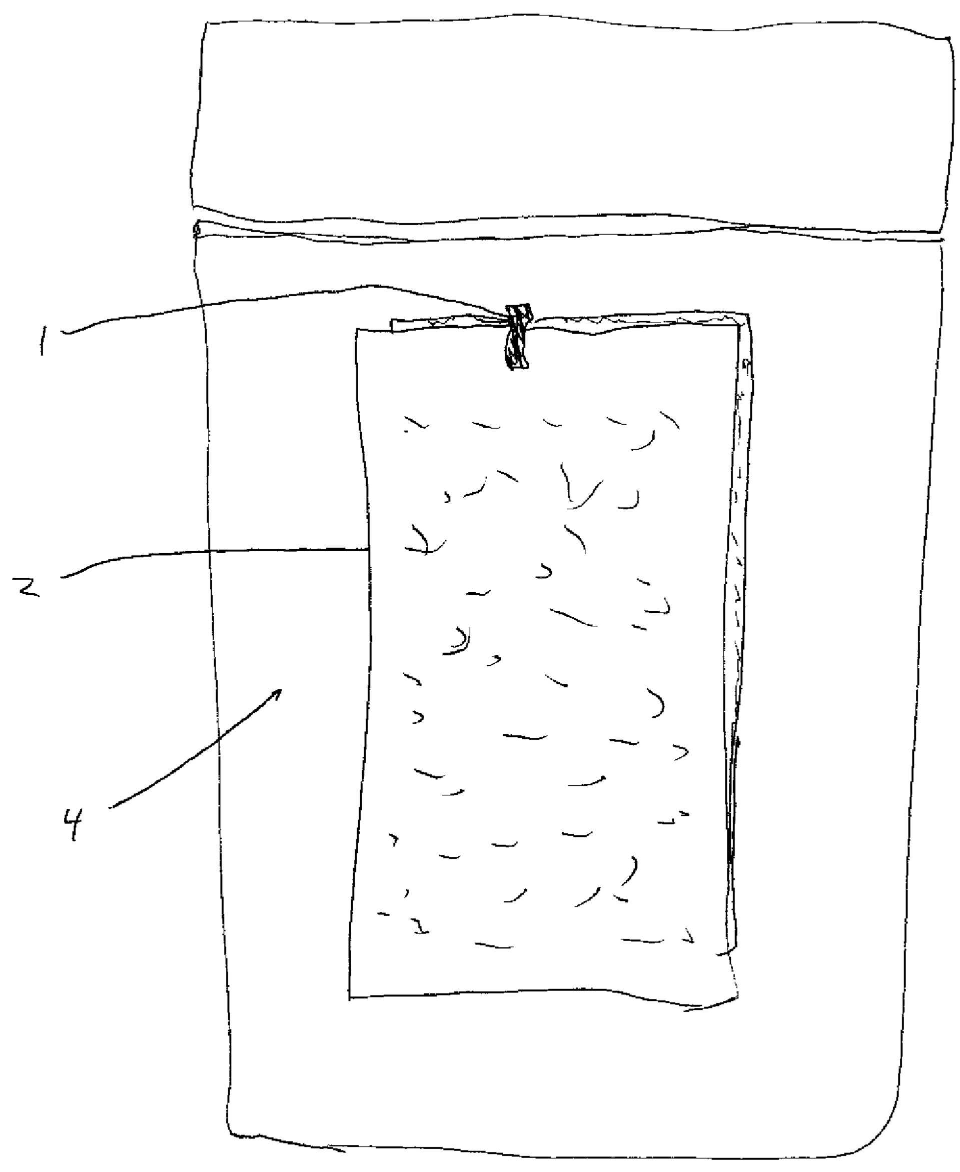
FIG. 9 is an embodiment of the Clip attached to a magnetic surface, in engaged state, in use with multiple sheets secured by the Clip.

When so attached to the surface 3, the Clip sits idle in this disengaged/receptive state awaiting the introduction of paper 2. Then, paper(s) 2 are introduced into the Clip 1 between the magnets 12, 13 and moved with a simple upward motion (see FIG. 4). The upward motion of the paper 2 pushes the middle of the ribbon 11, generally along the crease 111, dislocates the ends of the ribbon 11, and thereby moves the two magnets 12, 13 closer to each other into a position that allows for the attraction of the magnetic fields 121, 131. The two magnets 12, 13 then clamp around the paper(s) 2 and hold them securely; this position is the engaged or "closed" state.

When desired, the Clip 1 is disengaged when the unattached end of the ribbon 112 or an optional tab on the ribbon 113 is pulled laterally and slides the two magnets 12, 13 apart, thereby freeing the paper 2. This disengagement procedure also automatically resets the Clip 1 into its disengaged/receptive state.

An alternative way to reset the Clip 1 into its disengaged/receptive state is by pulling the paper 2 in a certain motion that separates the magnets 12, 13 without needing to pull the unattached end 112 (or optional tab 113). This alternate method of removal makes the Clip 1 a very effortless way to interact with the suspended items 2.

Further, some embodiments of the Clip 1 may be used on both magnetic 4 and non-magnetic surfaces 3. These embodiments utilize repositionable adhesive methods 14 or other methods well known in the prior art that increase the friction between the Clip 1 and the magnetic surface 4. Preferably these adhesive methods 14 are either (1) repositionable adhesive squares that are permanently affixed to the Clip 1 and are refreshable by use of water and soap to reclaim lost tackiness, or (2) the application of silicone (e.g. silicone caulking or other grip enhancing substance) to the back of the Clip 1 in a thin layer so that, when dried, the Clip's magnetic attraction with the metallic surface 4 creates additional friction thus preventing downward sliding; the materials for both of these methods are well known in the prior art. However, when the Clip 1 is used on a magnetic surface 4, the Clip 1 will not hang in the disengaged/open position when in its receptive state without careful positioning. In this scenario, the Clip 1 is operated by pulling the unattached end 112 (or optional tab 113) and clamping the magnets 12, 13 around the items 2 to be suspended, thereby entering the engaged/closed state.

The Clip 1 improves on the prior art suspension technologies in that the invention avoids the damage to paper 2 or wall 3, 4 caused by creating a hole (e.g., thumbtacks), or staining or stripping off some of the finish or surface (e.g., adhesives). Additionally, this invention improves upon the prior art in terms of its capacity, versatility, reusability, and ease of use.

In the embodiment described above, the Clip 1 is capable of suspending at least ten (10) sheets of paper 2 without damaging the papers 2 and can be used to suspend anything that is flat like birthday cards, envelopes, newspaper sections, cash, photographs, small magazines, calendars, brochures, and more.

As well, small objects that respond to magnetic attraction can be suspended as well. For example, scissors and screw drivers may be suspended by the Clip 1. The Clip 1 can be used anywhere in the home, the office, and the even the automobile. This invention may be used anywhere one or more sheets of paper need to be quickly fastened and removed.

In addition, the Clip 1 is more easily employed than the prior art. For example, using thumbtacks require two hands, one to hold the paper, and one to push (for insertion) or pull (for removal) the tack. This invention may be operated using only one hand, as described above.

Using the Clip 1 is very quick. In some testing of the embodiment described above, the suspension of papers 2 utilizing the Clip 1 took less than about one second from when the Clip 1 was in its disengaged/receptive state.

Thus, this Clip 1 increases the efficiency, speed, and ease of suspending one or more papers or other items in a vertical orientation, while preventing damage to the papers 2 and vertical surfaces 3, 4.

In other embodiments of this invention, the optimal length of the ribbon 11 depends upon the strength of the magnets 12, 13. As the magnets 12, 13 used get stronger, a longer ribbon 11 is needed so that there is enough space between the magnets 12, 13 to keep them far enough separated to be in their disengaged/receptive position.

For each embodiment, there is a preferred shape and length of the ribbon 11 that keeps separate the magnets 12, 13 while in the disengaged/receptive position.

The preferred shape for the Clip 1 to function is illustrated in the Figures of this application. To help maintain this shape and add rigidity, an embodiment of this invention adds a strip of silicone caulking which provides sufficient rigidity/stiffness for the Clip 1 to fall reliably into the rest position.

The preferred length is affected by qualities of the ribbon 11 such as stiffness, and the ability to hold a crease 111 generally near the mid point of the ribbon 11.

Further, embodiments of the crease 111 should be configured to allow the Clip 1 to spring back into the closed position when the suspended item 2 is removed. With appropriate configuration of the crease 111, the Clip 1 will fall gently into the disengaged/receptive/open position without springing back up.

Embodiments also illustrate that the gentle bend of the ribbon 11 closest to the base/wall magnet is important. If the stiffness in this area is too low, when hanging in the disengaged/receptive/open position, the ribbon 11 sags down and looks sloppy. If stiffness in this area is too high, the Clip 1 will not fall into the disengaged/receptive/open position and will instead spring back into the engaged/closed position.

In addition, for each embodiment, the ribbon 11 configuration is selected to effect attachment and removal of the suspended item 2 which is far easier and requires less effort than the devices and methods disclosed in the prior art. Also, the ribbon 11 configuration, especially but not limited to the length of the ribbon 11, is selected to increase the aesthetic appeal of the Clip 1, by minimizing a "sloppy" look of the Clip 1 either in use or at rest.

Although this invention has been described with a certain degree of particularity, it is to be understood that the present disclosure (including, without limitation, all drawing pages) has been made only by way of illustration, and that numerous changes in the details of the system, apparatus, and/or method may be resorted to without departing from the spirit and scope of the invention.

For example, the Clip 1 may be formulated to suspend and hold objects other than paper or thin strips 2, such as a toothbrush and a tooth flosser, where magnets are attached or embedded in the object so that these magnets are attracted to the magnets 12, 13 in the Clip 1, thereby suspending and holding the object.

I claim:

1. A clip system for holding an object, the system comprising:

a vertical surface;

a clip comprising:

a continuous ribbon of flexible material having a first portion, second portion, and a bending portion connecting the first and second portions;

the first portion having a first magnet;

the second portion having a second magnet;

the clip attached to the vertical surface with the bending portion above the first and second portions and the bending portion having a stiffness to allow the first and second magnets to assume and maintain a disengaged position relative to each other; and the object when placed between the first and second portions and in contact with the bending portion, urging the first and second magnets into an engaged position; and the object when removed from contact with the bending portion and between the first and second portions, allows the stiffness of the bending portion to urge the first and second magnets to assume and maintain the disengaged position.

2. A clip for use in a clip system for holding an object, the clip comprising:

a continuous ribbon of flexible material having a first portion, second portion, and a bending portion connecting the first and second portions;

the first portion having a first magnet;

the second portion having a second magnet;

the clip being attachable to a vertical surface with the bending portion above the first and second portions and the bending portion having a stiffness to allow the first and second magnets to assume and maintain a disengaged position relative to each other when the clip is so attached to the vertical surface.

3. A method for holding an object in a vertical orientation, the method comprising the steps of:

(a) employing a clip comprising:

a continuous ribbon of flexible material having a first portion, second portion, and a bending portion connecting the first and second portions;

the first portion having a first magnet;

the second portion having a second magnet;

the first and second magnets not in a proximate position relative to each other;

(b) attaching the clip to a vertical surface with the bending portion above the first and second portions;

(c) placing the object between the first and second portions; and (d) pushing the object into contact with the bending portion urging the first and second magnets into the proximate position.

4. The method as described in claim 3, further comprising the steps of:

(e) removing the object from contact with the bending portion and from between the first and second portions, thereby urging the first and second magnets out of the proximate position.

5. The clip as described in claim 2, wherein the first and second magnets comprise neodymium.

6. The clip as described in claim 2, wherein the clip is attached to the vertical surface by adhesive.

7. The method as described in claim 3, wherein the first and second magnets comprise neodymium.

8. The method as described in claim 3, wherein the attaching step comprises adhesive.

* * * * *